United States Patent
Suzuki et al.

(10) Patent No.: US 7,785,206 B2
(45) Date of Patent: Aug. 31, 2010

(54) FIXED CONSTANT VELOCITY UNIVERSAL JOINT

(75) Inventors: Tadashi Suzuki, Iwata (JP); Masaru Murayama, Iwata (JP); Masazumi Kobayashi, Iwata (JP)

(73) Assignee: NTN Corporation, Osaka-Fu (JP)

( * ) Notice: Subject to any disclaimer, the term of this patent is extended or adjusted under 35 U.S.C. 154(b) by 368 days.

(21) Appl. No.: 11/370,839

(22) Filed: Mar. 9, 2006

(65) Prior Publication Data

US 2006/0211503 A1 Sep. 21, 2006

(30) Foreign Application Priority Data

Mar. 16, 2005 (JP) .............................. 2005-075287

(51) Int. Cl.
*F16D 3/16* (2006.01)

(52) U.S. Cl. ........................ 464/145; 464/902; 464/906

(58) Field of Classification Search ................. 464/140, 464/145, 146, 902, 906; 29/898.067
See application file for complete search history.

(56) References Cited

U.S. PATENT DOCUMENTS

| | | | |
|---|---|---|---|
| 6,120,382 A | 9/2000 | Sone et al. | |
| 6,267,682 B1 | 7/2001 | Sone et al. | |
| 6,299,542 B1 | 10/2001 | Ouchi et al. | |
| 6,506,121 B2* | 1/2003 | Kobayashi et al. | ........... 464/145 |
| 7,097,567 B2 | 8/2006 | Kobayashi et al. | |
| 7,258,616 B2 | 8/2007 | Kobayashi et al. | |
| 2001/0002369 A1 | 5/2001 | Kobayashi et al. | |
| 2002/0022528 A1 | 2/2002 | Nakagawa et al. | |
| 2002/0077186 A1* | 6/2002 | Hosoya et al. | ............... 464/145 |
| 2003/0017877 A1 | 1/2003 | Kobayashi et al. | |
| 2004/0180724 A1 | 9/2004 | Nakagawa et al. | |
| 2005/0079918 A1 | 4/2005 | Kobayashi et al. | |

FOREIGN PATENT DOCUMENTS

| | | |
|---|---|---|
| CN | 1523244 | 8/2004 |
| EP | 1 512 879 A1 | 3/2005 |
| JP | 9-177814 | 7/1997 |
| JP | 11-311257 | 11/1999 |
| JP | 2003-4062 | 1/2003 |
| JP | 2003-307235 | 10/2003 |
| JP | 2005-83408 | 3/2005 |

OTHER PUBLICATIONS

Chinese Office Action issued Oct. 17, 2008 in Chinese Application No. 200610068197.8.
European Search Report issued Jun. 14, 2006 in European Application No. 06 25 1238.
Result of Consultation issued Apr. 8, 2009 in European Application No. 06 251 238.9.
Japanese Office Action issued Sep. 8, 2009 in corresponding Japanese Application No. 2005-075287 (with English translation).

* cited by examiner

*Primary Examiner*—Aaron M Dunwoody
(74) *Attorney, Agent, or Firm*—Wenderoth, Lind & Ponack, L.L.P.

(57) ABSTRACT

A fixed constant velocity universal joint using eight torque transmitting balls has a ratio which a non-hardened layer assumes in a bar 48 of a cage 40 is set to be $0.30 \leq C/S \leq 0.75$, where S represents a cross-sectional area of the bar 48 and C represents an area of the non-hardened layer.

4 Claims, 8 Drawing Sheets

FIG. 1

FIG. 2 bar
(cross-sectional area S)

Non-hardened layer
(cross-sectional area C)

FIXED CONSTANT VELOCITY UNIVERSAL JOINT

BACKGROUND OF THE INVENTION

1. Field of the Invention

The present invention relates to a fixed constant velocity universal joint for use in automobiles and various industrial machines and, more particularly, to a fixed constant velocity universal joint using eight balls as torque transmitting elements.

2. Description of the Background Art

Figure 14:
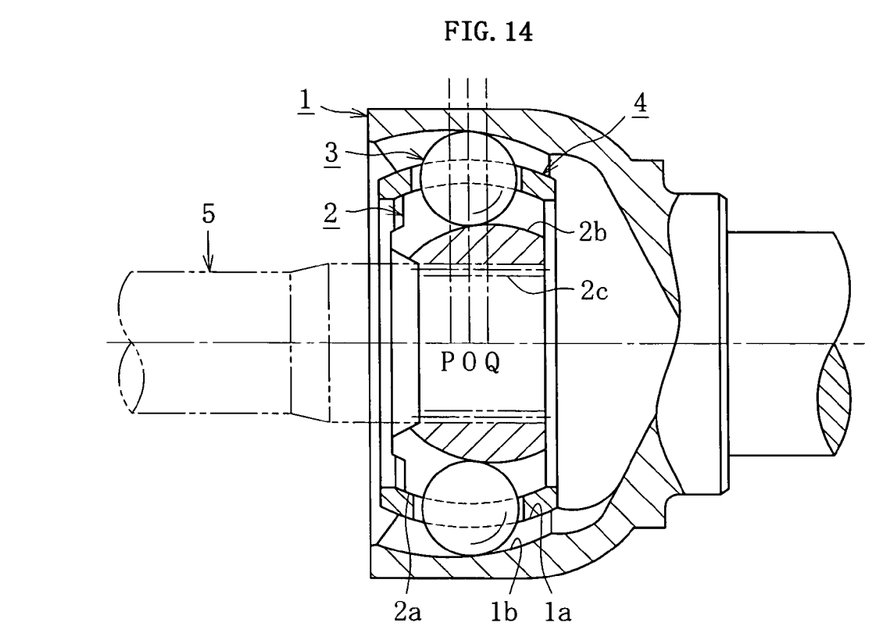
FIG. 14 is a longitudinal sectional view of a conventional fixed constant velocity universal joint.
Figure 15:
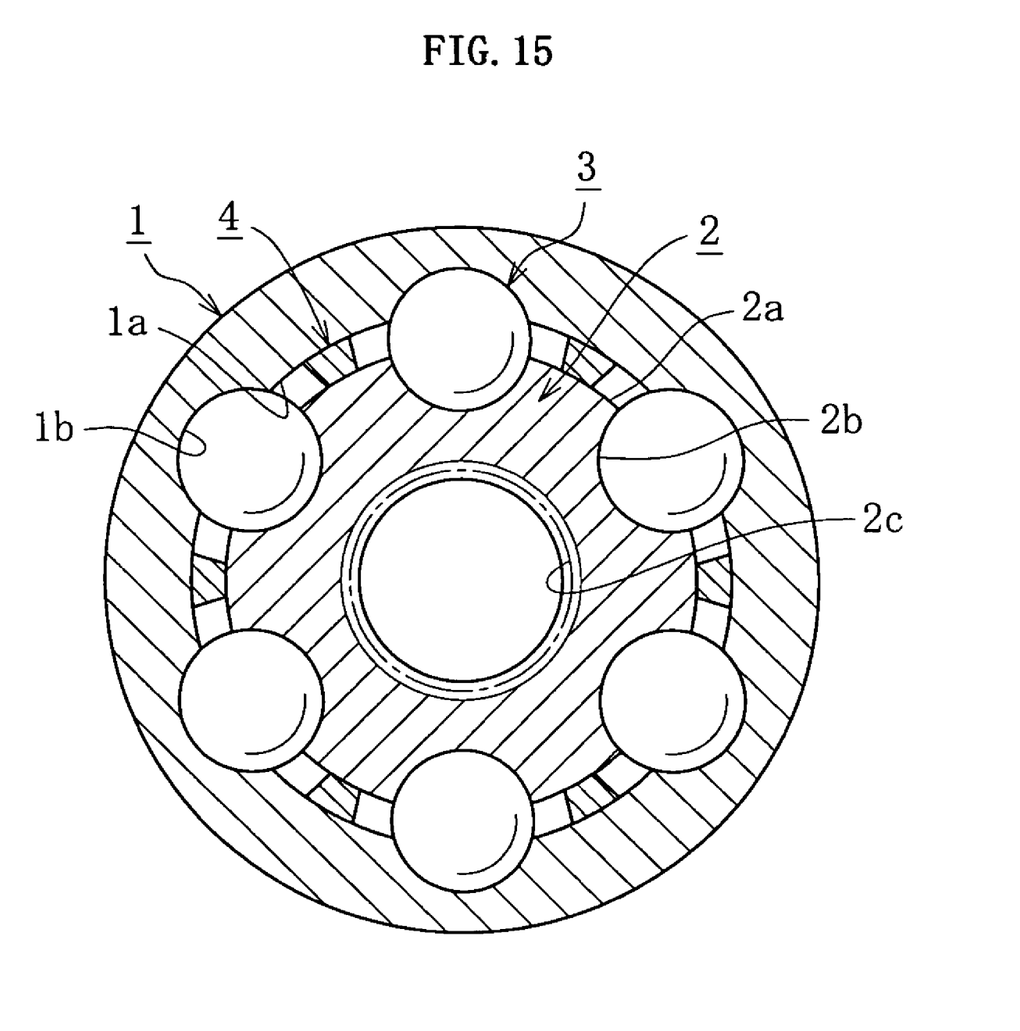
FIG. 15 is a cross-sectional view of the joint shown in FIG. 14.

Constant velocity universal joints are classified into fixed joints which cannot slide and sliding or plunging joints which can slide in the axial direction thereof. FIGS. 14 and 15 show a Rzeppa constant velocity universal joint (hereinafter referred to as BJ-type) as a typical fixed constant velocity universal joint. This fixed constant velocity universal joint is comprised of an outer ring 1 as an outer joint member having six axially extending arcuate ball grooves 1b formed in a spherical inner surface 1a thereof, an inner ring 2 as an inner joint member having six axially extending arcuate ball grooves 2b formed in a spherical outer surface 2a thereof, six balls 3 as torque transmitting elements arranged between the ball grooves 1b of the outer ring 1 and the ball grooves 2b of the inner ring 2, and a cage 4 holding the balls 3.

Centers P and Q of the ball grooves 1b and 2b, respectively, are axially offset from a joint center O by the same distance (PO=QO) on either side of the center O. That is, the center P of the ball grooves 1b of the outer ring 1 is offset on the opening side of the outer ring 1 from the center O of the spherical inner surface 1a by the distance PO. The center Q of the ball grooves 2b of the inner ring 2 is offset on the inner side of the outer ring 1 from the center O of the spherical outer surface 2a by the distance QO. The centers of the inner surface 1a of the outer ring 1 and the outer surface 2a of the inner ring 2 are matched with the joint center O.

One of shafts to be coupled (not shown) is connected to the outer ring 1 and the other, shaft 5, is connected to the inner ring 2. Thus, the inner ring 2 has a serrated or splined hole 2c for engagement with a serrated or splined part of the shaft 5. When the axes of the outer ring 1 and the inner ring 2 form an angle (operating angle of the joint), the balls 3 are retained by the cage 4 within a plane perpendicular to a bisector of the operating angle, thereby ensuring a constant angular velocity of the inner and outer rings.

In the fixed constant velocity universal joint using eight balls, the internal design is optimized to ensure the same durability and strength as a fixed constant velocity universal joint using six balls. See Japanese unexamined patent documents H9-177814, 2003-4062, and 2003-307235.

SUMMARY OF THE INVENTION

In a fixed constant velocity universal joint, when torque is transmitted at an operating angle, a ball moves in a cage pocket in the circumferential direction as well as radial direction of the cage. In a fixed constant velocity universal joint using six balls, the thickness of a cage satisfies a radial movement of the balls when the joint forms a maximum operating angle. In other words, a minimum thickness is set as long as a ball contact point falls in the cage pocket. This is due to the fact that an increase in cage thickness makes ball grooves of outer and inner rings shallower, thereby decreasing the fatigue life of the joint at high angles and high loads.

In a fixed constant velocity universal joint using eight balls capable of realizing further reduction in size and weight, it is important to ensure the same strength at a high operating angle as that with the fixed constant velocity universal joint using six balls. To improve the strength of the cage, the thickness of the cage should be increased. However, as the thickness of the cage is increased, the depth of the ball grooves of the outer and inner rings becomes shallower. When the depth of the ball grooves of the outer and inner rings becomes shallower, a contact ellipse of the ball runs onto shoulders of the ball grooves at high angles and high torque loads, leading to decrease in fatigue life.

Furthermore, in the fixed constant velocity universal joint using eight balls, it is important to ensure the same cage strength at a high operating angle as that in the fixed constant velocity universal joint using six balls. In the fixed constant velocity universal joint using eight balls, the same cage strength at a high operating angle as that in the fixed constant velocity universal joint using six balls is ensured through the optimization of internal design as described above. Nevertheless, the cage thickness is thinner than that in the fixed constant velocity universal joint using six balls.

A main object of the present invention is to ensure the cage strength at high angles as well as fatigue life at high angles and high torque loads in the fixed constant velocity universal joint using eight balls.

To ensure the cage strength at high angles in the fixed constant velocity universal joint using eight torque transmitting balls more stably, heat treatment becomes important. Therefore, the present invention focuses on a ratio which a non-hardened layer occupies in bars of the cage as a heat treatment specification capable of bringing out the cage strength to the maximum in the fixed constant velocity universal joint using eight torque transmitting balls.

That is, the fixed constant velocity universal joint of the present invention, when it is a BJ type, has an outer joint member having eight axially extending arcuate ball grooves formed in a spherical inner surface thereof, an inner joint member having eight axially extending arcuate ball grooves formed in a spherical outer surface thereof, eight balls each of which is interposed between a pair of the ball grooves of the outer and inner joint members for transmission of torque, and a cage interposed between the outer and inner joint members to retain the balls. The center of ball grooves of the outer joint member and the center of ball grooves of the inner joint member are each offset by the same distance (F) on opposite sides to each other in the axial direction with respect to the center of the spherical inner surface and the center of the spherical outer surface, respectively. A ratio C/S of an area of a non-hardened layer to a cross-sectional area S of the bars of the cage is set to be $0.30 \leq C/S \leq 0.75$.

The fixed constant velocity universal joint of the present invention, when it is a UJ type, has an outer joint member having eight axially extending arcuate ball grooves formed in a spherical inner surface thereof, an inner joint member having eight axially extending arcuate ball grooves formed in a spherical outer surface thereof, eight balls each of which is interposed between a pair of the ball grooves of the outer and inner joint members for transmission of torque, and a cage interposed between the outer and inner joint members to retain the balls. The center of ball grooves of the outer joint member and the center of ball grooves of the inner joint member are each offset by the same distance (F) on opposite sides to each other in the axial direction with respect to the center of the inner sphere and the center of the outer sphere, respectively. The centers of a spherical inner surface and a spherical outer surface of the cage are offset by the same distance (f) on opposite sides to each other in the axial direction, and a straight part having a straight bottom is provided on each of the ball grooves of the outer and inner joint members. A ratio C/S of an area of a non-hardened layer to a cross-sectional area S of the bars of the cage is set to be $0.30 \leqq C/S \leqq 0.75$.

According to the present invention, a cage with excellent durability and stable high strength can be obtained, so that the cage strength at high angles in the fixed constant velocity universal joint using eight torque transmitting balls can be ensured more stably.

These and other objects and features of the invention will become more apparent from the following description when read in conjunction with the accompanying drawings.

DETAILED DESCRIPTION OF THE INVENTION

Figure 5:
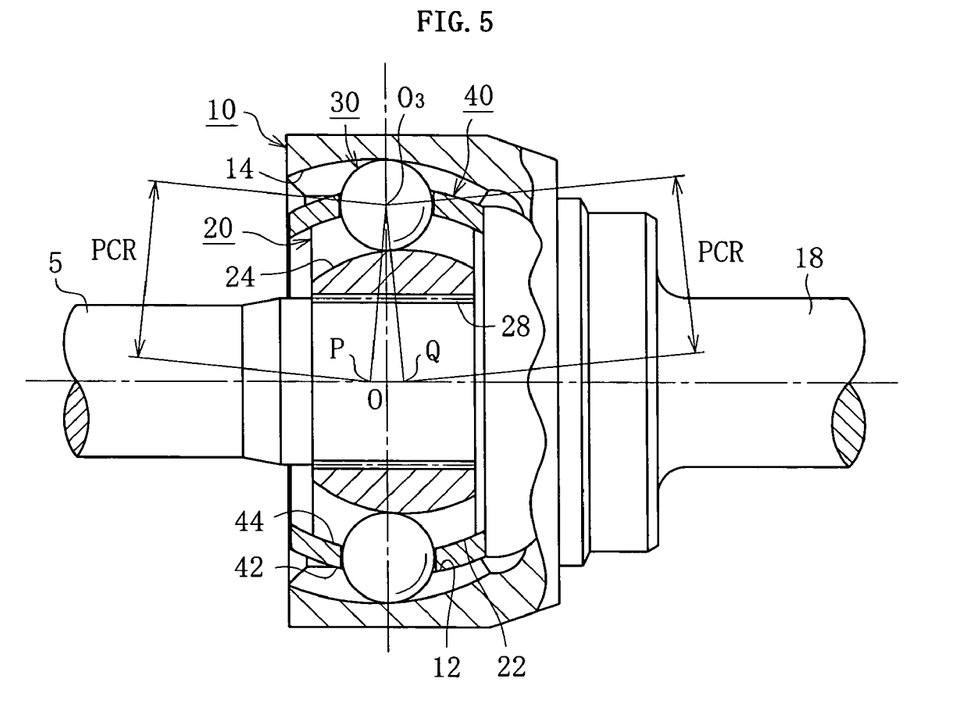
FIG. 5 is a longitudinal sectional view of a fixed constant velocity universal joint.

First, a BJ type in accordance with an embodiment shown in FIGS. 5 to 7 will be described. As shown in the figures, a fixed constant velocity universal joint includes an outer ring 10, an inner ring 20, balls 30 and a cage 40.

The outer ring 10 as an outer joint member is in the shape of a cup or bell and includes a shaft part 18 on its closed end side for connection with one of two shafts to be coupled. The outer ring 10 has a spherical inner circumferential surface, that is, inner sphere 12, and eight arcuate ball grooves 14 extending in the axial direction are formed in the inner sphere 12 in the circumferential direction at regular intervals.

The inner ring 20 as an inner joint member has a serrated or splined hole 28 for connection with the other of the two shafts to be coupled, here, a shaft 5. The inner ring 20 has a spherical outer circumferential surface, that is, outer sphere 22 and eight arcuate ball grooves 24 extending in the axial direction are formed in the outer sphere 22 in the circumferential direction at regular intervals.

The ball grooves 14 of the outer ring 10 and the ball grooves 24 of the inner ring 20 form pairs and a ball 30 as a torque transmitting element is mounted into a track formed of the ball grooves 14 and 24 as a pair. The eight balls 30 in total are retained by the cage 40. The cage 40 has a spherical outer circumferential surface or outer sphere 42 and a spherical inner circumferential surface or inner sphere 44 which have the same center. The outer sphere 42 is in contact with the inner sphere 12 of the outer ring 10 and the inner sphere 44 is in contact with the outer sphere 22 of the inner ring 20.

In this embodiment, centers P and Q of the ball grooves 14 and 24, respectively, are offset by the same distance (PO=QO=F) on either side of a joint center O in the axial direction. That is, the center P of the ball grooves 14 of the outer ring 10 (outer track center) is offset on the opening side of the outer ring 10 from the center O of the inner sphere 12 by the distance PO. The center Q of the ball grooves 24 of the inner ring 20 (inner track center) is offset on the inner side of the outer ring 10 from the center O of the outer sphere 22 by the distance QO.

The center of the outer sphere 42 of the cage 40 and the center of the inner sphere 12 of the outer ring 10 as a guide surface for the outer sphere 42 of the cage 40 coincide with the joint center O. The center of the inner sphere 44 of the cage 40 and the center of the outer sphere 22 of the inner ring 20 as a guide surface for the inner sphere 44 of the cage 40 also coincide with the joint center O. Thus, an offset (PO=F) of the outer ring 10 is equal to a distance between the center P of the ball grooves 14 and the joint center O in the axial direction and an offset (QO=F) of the inner ring 20 is equal to a distance between the center Q of the ball grooves 24 and the joint center O in the axial direction, which means that the both (PO, QO) are equal.

A length $PO_3$ of a line connecting the center P of the ball groove 14 of the outer ring 10 and a center $O_3$ of the ball 30 is equal to a length $QO_3$ of a line connecting the center Q of the ball groove 24 of the inner ring 20 and the center $O_3$ of the ball 30. The length is represented by a sign PCR in FIG. 5. Furthermore, as shown in FIG. 7, provided that an angle defined by the line connecting the center P of the ball groove 14 of the outer ring 10 and the center $O_3$ of the ball 30 and a line connecting the joint center O and the center $O_3$ of the ball 30 is referred to as an outer ring track offset angle βo and an angle defined by the line connecting the center Q of the ball groove 24 of the inner ring 20 and the center $O_3$ of the ball 30 and the line connecting the joint center O and the center $O_3$ of the ball 30 is referred to as an inner ring track offset angle βi, the outer ring track offset angle βo is equal to the inner ring track offset angle βi.

With this configuration, one of two shafts to be coupled is connected to the outer ring 10 and the other is connected to the inner ring 20. When the outer ring 10 and the inner ring 20 form an operating angle, the balls 30 retained by the cage 40 are kept within a plane perpendicular to a bisector of the operating angle. Accordingly, the distances $PO_3$ and $QO_3$ between the center $O_3$ of the ball and the centers P and Q of the ball grooves are equal to each other ($PO_3=QO_3=PCR$), ensuring that the angular velocity of the joint is a constant.

As described above, the offset of the ball grooves 14 and 24 (F=PO=QO) is preferably set so that a ratio R1=F/PCR falls within the scope of $0.069 \leqq R_1 \leqq 0.121$ in terms of the securement of allowable torque load, strength of the cage, durability and performance. In this embodiment, $R_1$ is set to be 0.104 (or 0.1038). A general value of $R_1$ in a comparison product (fixed constant velocity universal joint using six balls as shown in FIGS. 14 and 15) is 0.14 and $R_1$ in this embodiment is rather smaller than $R_1$ of the comparison product.

Figure 6:
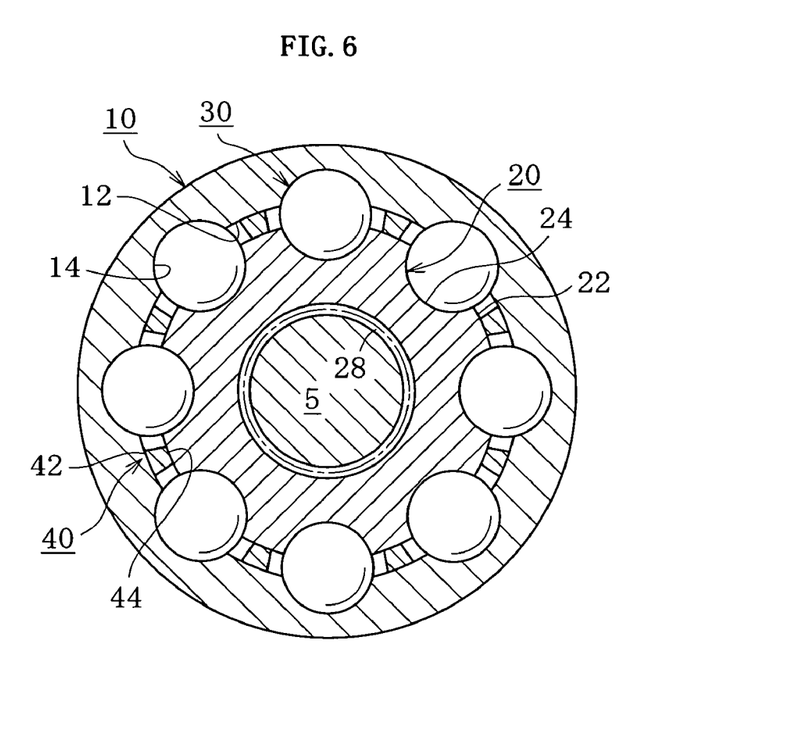
FIG. 6 is cross-sectional view of the joint shown in FIG. 5.
Figure 8:
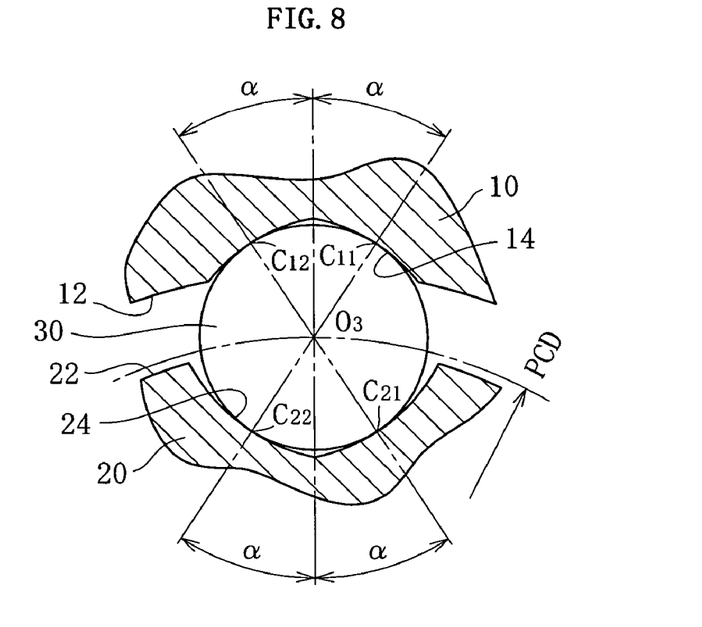
FIG. 8 is a partially enlarged view of FIG. 6.

FIG. 8 is a partial enlarged view of FIG. 6 and shows correlation of the outer ring 10, the inner ring 20 and the ball 30. The ball grooves 14 formed in the inner sphere 12 of the outer ring 10 each have a Gothic arch cross section and the ball grooves 24 formed in the outer sphere 22 of the inner ring 20 each have a Gothic arch cross section. Thus, the ball 30 comes in contact with the ball groove 14 of the outer ring 10 at two points $C_{11}$ and $C_{12}$ and with the ball groove 24 of the inner ring 20 at two points $C_{21}$ and $C_{22}$. Angles α defined by lines passing the center $O_3$ of the ball 30 and the contact points $C_{11}$, $C_{12}$, $C_{21}$ and $C_{22}$ and a line passing the center $O_3$ of the ball 30 and the joint section O are referred to as contact angles. The contact angles α at the contact point $C_{11}$, $C_{12}$, $C_{21}$ and $C_{22}$ are all the same and set to be 29° to 40°. The contact angle α of 29° to 40° is smaller than a contact angle of 37° to 45° in conventional undercut free joints (UJ) using six balls and fixed constant velocity universal joints using six balls. By setting the contact angle α to be 29° or more, a contact pressure between the ball groove and ball is restrained and thus durability equal to or higher than that in conventional products can be obtained.

Figure 7:
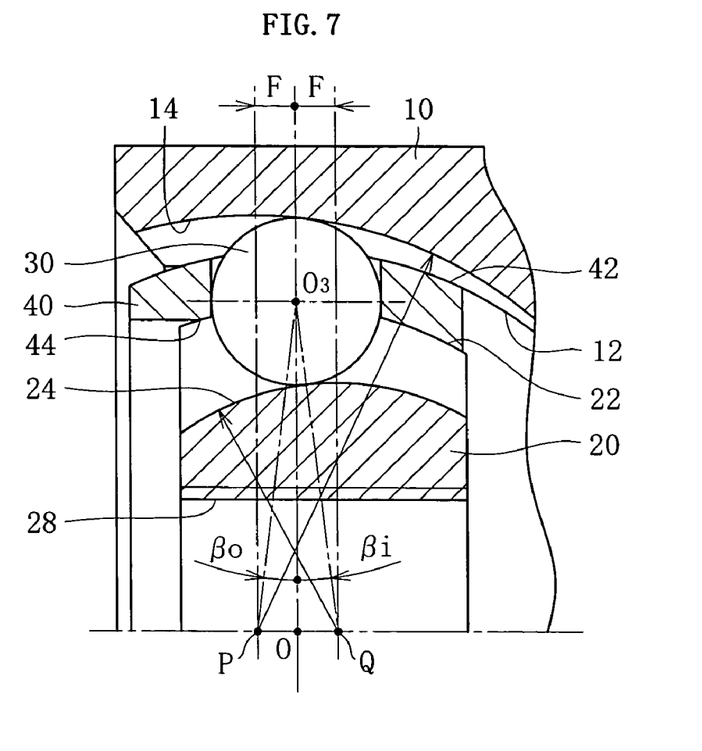
FIG. 7 is a partially enlarged view of FIG. 5.
Figure 9:
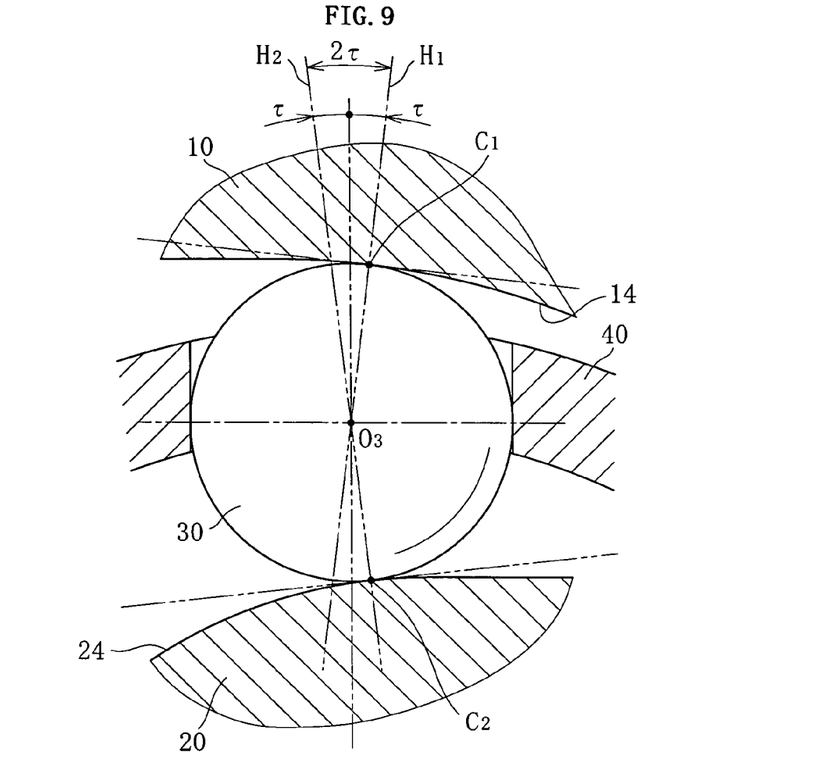
FIG. 9 is a partially enlarged view of FIG. 7.

FIG. 9 is a partial enlarged view of FIG. 7 for explaining a reverse start angle of wedge angle. As described above, an angle which a common normal $H_1$ passing the contact point $C_1$ between the ball 30 and the ball groove 14 of the outer ring 10 and a common normal $H_2$ passing the contact point $C_2$ between the ball 30 and the ball groove 24 of the inner ring 20 is referred to as a wedge angle 2τ. Similarly, the common normal $H_2$ is a three-dimensional straight line connecting the contact point between the inner ring 20 and the ball 30 and the center $O_3$ of the ball 30. As shown in FIG. 9, the contact point $C_1$ between the ball groove 14 of the outer ring 10 and the ball 30 is inclined with respect to the joint center plane passing the center $O_3$ of the ball 30 by an angle τ due to the arcuate ball groove 14. The contact point $C_2$ of the ball groove 24 of the inner ring 20 with the ball 30 is inclined with respect to the joint center plane passing the center $O_3$ of the ball 30 by an angle τ due to the curved ball groove 24. The wedge angle corresponds to the sum of these angles τ, that is 2τ. The wedge angle 2τ becomes smaller at a phase as the operating angle of the joint is increased and then is inversed. The operating angle at which the wedge angle 2τ starts to be inversed is set to be 9° or more.

Figure 10:
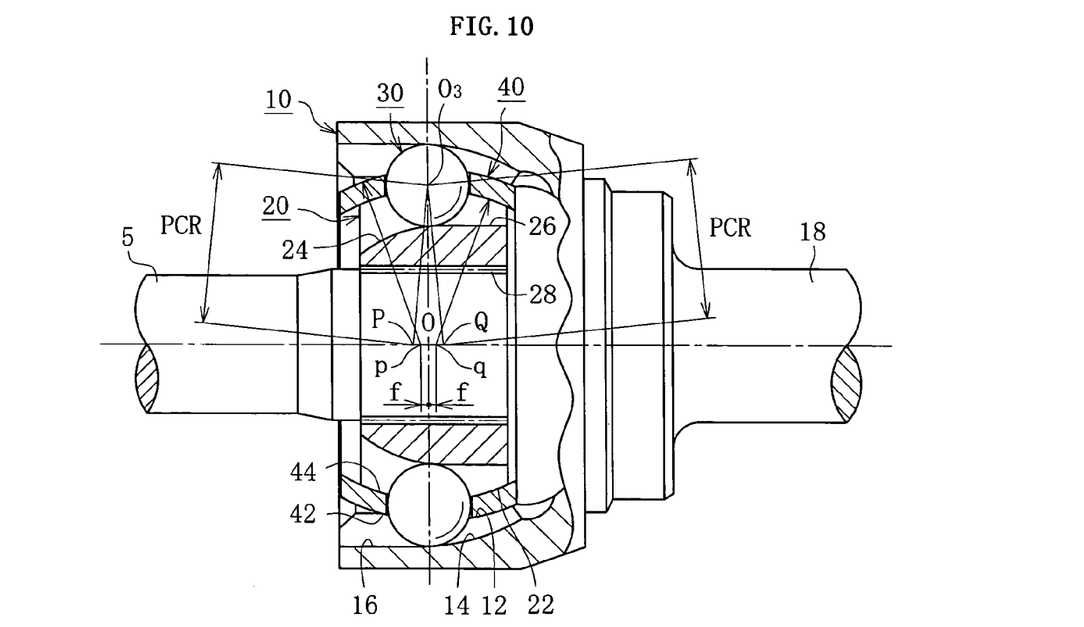
FIG. 10 is a longitudinal sectional view of a fixed constant velocity universal joint in accordance with another embodiment of the present invention.

FIG. 10 shows an embodiment of a UJ type. This embodiment is the same as the above-mentioned embodiment shown in FIG. 5 except that straight parts 16 and 26 are formed in the ball groove 14 of the outer ring 10 and the ball groove 24 of the inner ring 20, respectively, and that centers p and q of the outer sphere 42 and the inner sphere 44 of the cage 40 are offset by a same distance f axially in opposite directions to each other.

Figure 11:
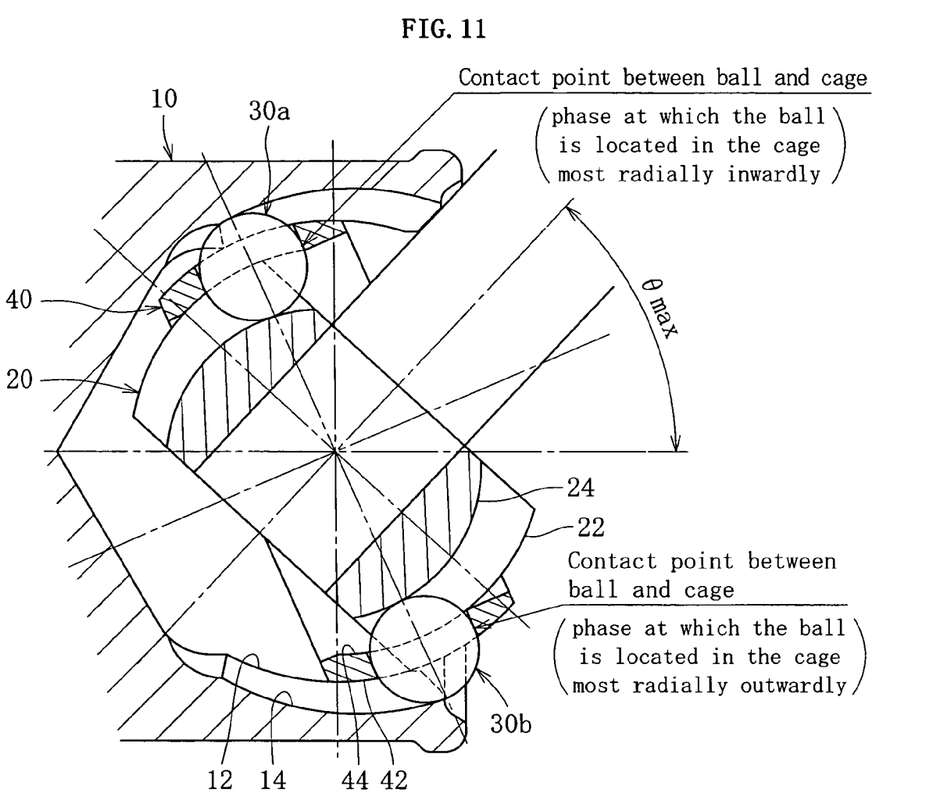
FIG. 11 is a longitudinal sectional view of the joint shown in FIG. 5 at a maximum operating angle.
Figure 12:
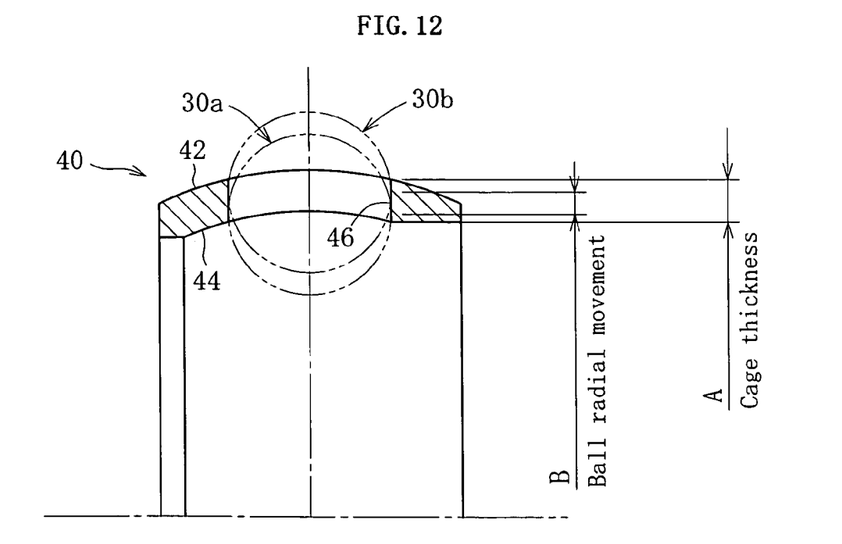
FIG. 12 is a longitudinal sectional view of a cage in the joint shown in FIG. 11.

Next, as shown in FIG. 11, compared with the conventional fixed constant velocity universal joint using six balls, in the fixed constant velocity universal joint using eight balls, an optimum cage thickness for ensuring equal or higher cage strength at high angles and fatigue life at high angles and high loads will be described. FIG. 11 shows a state where the joint shown in FIG. 5 forms a maximum operating angle θmax. The ball appearing in the upper portion of the Figure is designated by a reference numeral 30a and the ball 30a is in a phase in which it is located most radially inwardly of the cage. The ball appearing in the lower portion of the Figure is designated by a reference numeral 30b and the ball 30b is in a phase in which it is located most radially outwardly of the cage. FIG. 12 is a longitudinal sectional view of the cage 40 in which the balls 30a and 30b are shown by chain double-dashed lines and a distance B between centers of the balls 30a and 30b is defined as a radial movement of the ball in a pocket 46 of the cage 40. A thickness of the cage 40 is a radial dimension of a circumferentially extending wall of the pocket 46 and is designated by a reference character $\underline{A}$ in FIG. 12.

Given that the thickness of the cage 40 is A and the radial movement of the ball 30 at the maximum operating angle θmax. for one rotation of the joint is B, the thickness A of the cage 40 is set so as to meet the range of 0.45≦B/A≦0.65 in the BJ type and 0.65≦B/A≦0.85 in the UJ type. The reason why the range of optimum value for the UJ type is different from that for the BJ type is that, as described in relation to FIG. 10, the ball grooves 14 and 24 of the outer and inner rings have straight parts 16 and 26, respectively, in the UJ type and thus the ball grooves becomes shallower on the inner side of the joint in comparison with the BJ type.

Figure 13:
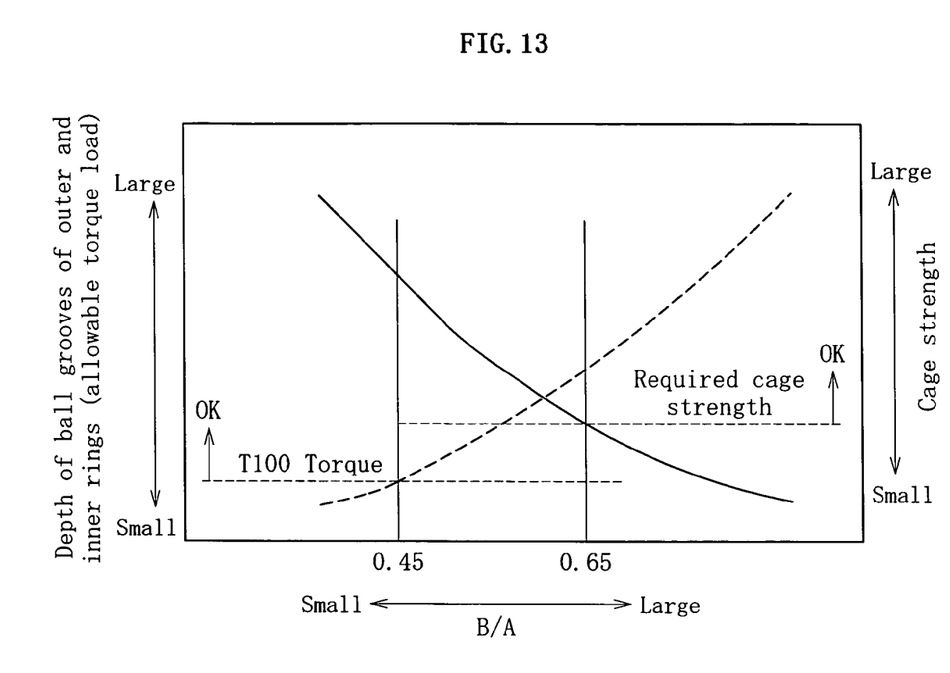
FIG. 13 is a diagram showing a relationship between cage strength and allowable torque load with respect to cage thickness.

FIG. 13 illustrates the significance of the above-mentioned numerical range. While numerical values in FIG. 13 relate to the BJ type, a similar tendency can be found in the UJ type as well. In this figure, T100 torque is a basic torque used for the calculation of a lifetime of constant velocity universal joints, depending on the contact stress between the ball grooves of the outer and inner rings and the ball (Hertzian stress) and means a torque which can obtain a lifetime of 1500 hours at 100 rpm.

As shown in FIG. 13, in the case of B/A<0.45, in other words, when the cage thickness A is larger than necessary with respect to the radial movement B of the ball 30 in the pocket 46 of the cage 40, a sufficient strength of the cage can be ensured. However, the depth of the ball grooves of the outer and inner rings (on inner side) becomes too shallow, so that a contact ellipse of the ball 30 comes out of the ball grooves at the maximum operating angle and the torque load is extremely lowered, resulting in the possible impairment in function of the joint. On the other hand, in the case of B/A>0.65, in other words, when an allowance of the cage thickness A is small with respect to the radial movement B of the ball 30 in the pocket 46 of the cage 40, a sufficient depth of the ball grooves of the outer and inner rings (on inner side) can be ensured, so that the contact ellipse of the ball 30 does not come out of the ball grooves even at the maximum operating angle. Nevertheless, the thickness A of the cage 40 becomes too thin and thus the cage strength at high angles cannot be ensured. This tendency in the BJ type can be found also in the UJ type using eight balls. However, numerical ranges are different from each other due to differences in configuration as described above.

As described above, an optimum thickness of the cage needs to be set in order to satisfy the cage strength at high angles and durability of the joint at high angles. The optimum thickness falls within the above-mentioned ranges (0.45≦B/A≦0.65 in the BJ type, 0.65≦B/A≦0.85 in the UJ type).

By the way, the cage of the fixed constant velocity universal joint is generally made of case hardening steel for machine structural use, which is subjected to carburizing and hardening. The cage requires high strength (static strength and fatigue strength) so as to bear high torques and cyclic loads. Furthermore, wear resistance is needed because of metal to metal contact between the components of the constant velocity universal joint. For this reason, the cage needs to be subjected to heat treatment so as to satisfy the functions necessary for the constant velocity universal joint. Especially in the fixed constant velocity universal joint using eight balls, compared with the fixed constant velocity universal joint using six balls, the cage is thinner and the cross-sectional area of a bar 48 between the pockets 46 is smaller. Thus, the cage strength tends to be largely affected by heat treatment specifications.

Figure 1:
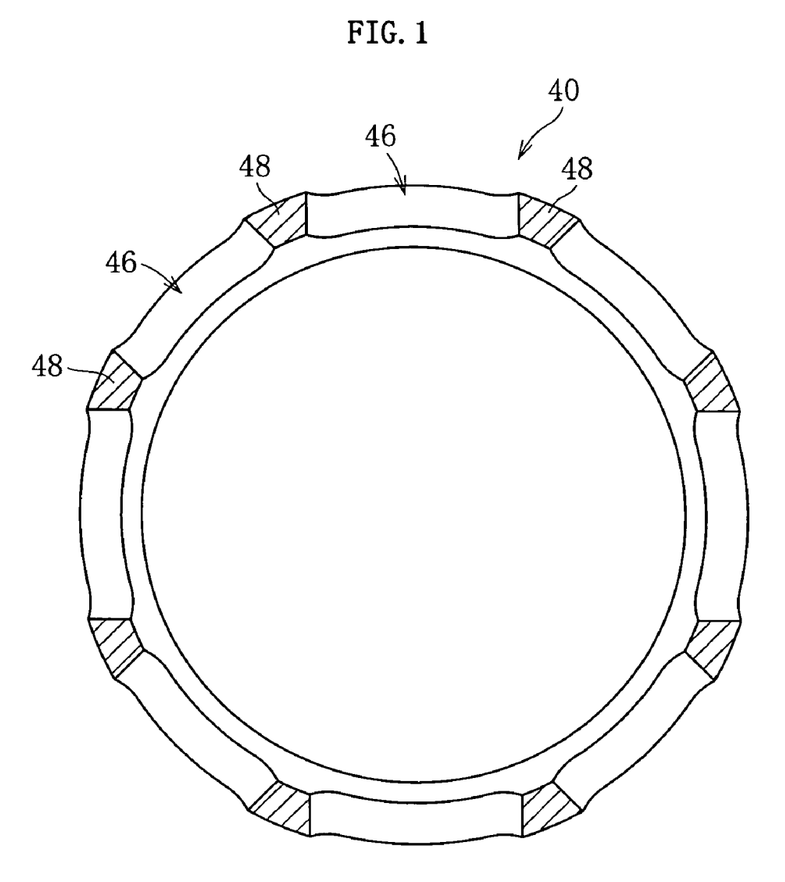
FIG. 1 is a cross-sectional view of a cage in accordance with an embodiment of the present invention.
Figure 2:
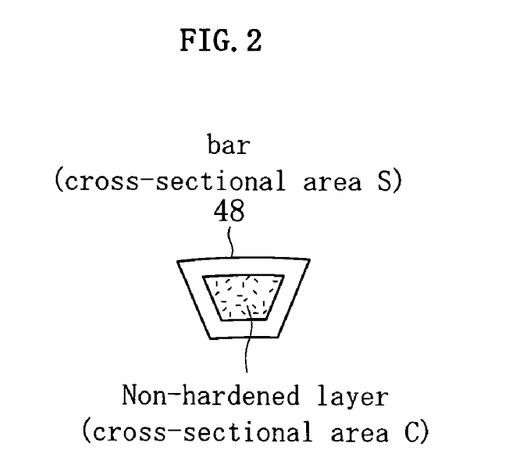
FIG. 2 is a schematic sectional view of a bar of the cage shown in FIG. 1.
Figure 3:
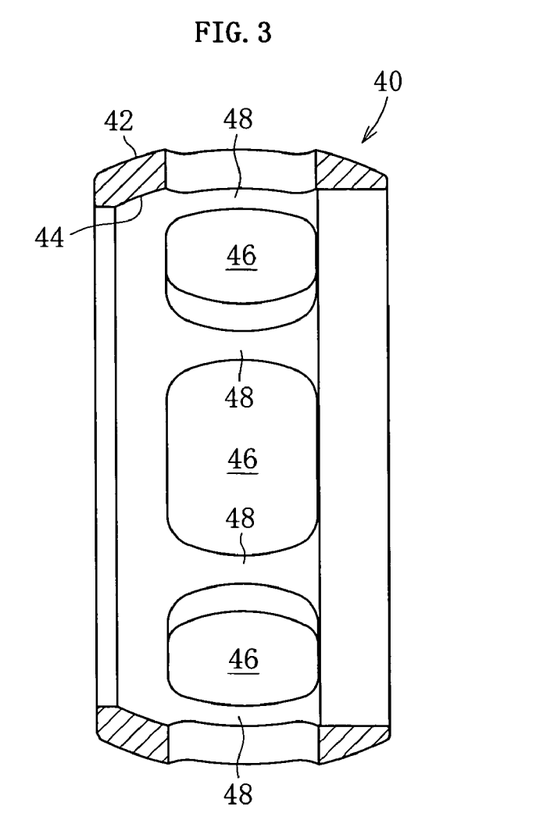
FIG. 3 is a longitudinal sectional view of the cage shown in FIG. 1.

Accordingly, a ratio which a non-hardened layer occupies in the bar 48 of the cage 40 is noted as heat treatment specifications bringing out the strength of the cage 40 to the maximum in the fixed constant velocity universal joint using eight torque transmitting balls. Here, the non-hardened layer, as shown by pearskin finish in FIG. 2, refers to a core part with the Vickers hardness number of less than Hv513. As shown FIGS. 1 to 3, given that a cross-sectional area of the bar 48 between the pockets 46 of the cage 40 is S and an area of the non-hardened layer of the bar 48 is C, a ratio C/S of the area of the non-hardened layer C to the cross-sectional area S of the bar 48 is set to fall within the range of $0.30 \leq C/S \leq 0.75$.

When a carbon infiltration depth of the cage 40 is set to meet the above-mentioned range, the maximum strength of the cage 40 can be realized. When C/S is smaller than the lower limit 0.30, the core (non-hardened layer part) of the bar 48 becomes too small and the cage 40 lacks its toughness, leading to the decrease in strength. On the other hand, even when the upper limit of C/S is larger than 0.75, strength is satisfied, and however, the upper limit needs to be set as 0.75 or less in consideration with fatigue life (wear).

Figure 4:
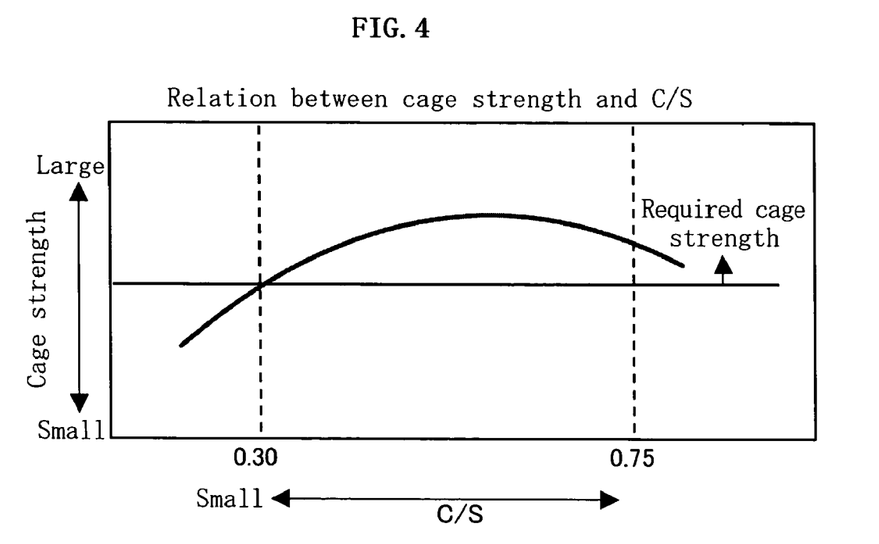
FIG. 4 is a diagram showing a relationship between ratios (C/S) which a non-hardened layer occupies in the bars of the cage and cage strength.

FIG. 4 shows a result of a strength test carried out using a sample with the carbon infiltration depth of the cage 40 in the fixed constant velocity universal joint using eight torque transmitting balls. In FIG. 4, the horizontal axis represents C/S and the vertical axis represents cage strength. From the figure, it is apparent that the cage strength can be brought out to the maximum by setting C/S as an optimum value.

What is claimed is:

1. A fixed constant velocity universal joint comprising:
   an outer joint member having eight axially extending arcuate ball grooves formed in a spherical inner surface thereof;
   an inner joint member having eight axially extending arcuate ball grooves formed in a spherical outer surface thereof;
   eight balls interposed between said ball grooves of said outer joint member and said ball grooves of said inner joint member for transmission of torque; and
   a cage, interposed between said outer joint member and said inner joint member, retaining said balls;
   wherein said ball grooves of said outer joint member have a center that is offset by a distance in an axial direction with respect to and on one side of the center of said spherical inner surface and said spherical outer surface, and said ball grooves of said inner joint member have a center that is offset by said distance in the axial direction with respect to and on an opposite side of the center of said spherical inner surface and said spherical outer surface;
   wherein said cage comprises pockets receiving said balls therein and bars separating said pockets from each other;
   wherein said bars have a cross-sectional area S comprising a hardened layer area and a non-hardened layer area C, having a Vickers hardness less than Hv513, and a ratio C/S is set to be $0.30 \leq C/S \leq 0.75$; and
   wherein said cage has a thickness A, radial movement of said balls with respect to said cage at a maximum operating angle of said joint is B and $0.45 \leq B/A \leq 0.65$.

2. The fixed constant velocity universal joint of claim 1, wherein a surface hardness of said cage ranges between HRC58 and HRC63 and core hardness ranges between HRC25 and HRC45.

3. A fixed constant velocity universal joint comprising:
   an outer joint member having eight axially extending arcuate ball grooves formed in a spherical inner surface thereof;
   an inner joint member having eight axially extending arcuate ball grooves formed in a spherical outer surface thereof;
   eight balls interposed between said ball grooves of said outer joint member and said ball grooves of said inner joint member for transmission of torque; and
   a cage, interposed between said outer joint member and said inner joint member, retaining said balls;
   wherein said ball grooves of said outer joint member have a center that is offset by a distance in an axial direction with respect to and on one side of the center of said spherical inner surface and said spherical outer surface, and said ball grooves of said inner joint member have a center that is offset by said distance in the axial direction with respect to and on an opposite side of the center of said spherical inner surface and said spherical outer surface;
   wherein centers of outer and inner spherical surfaces of said cage are offset by a same distance in the axial direction on opposite sides of the center of said spherical inner surface and said spherical outer surface;
   wherein each of said ball grooves of said outer joint member and said inner joint member has a straight part having a straight bottom;
   wherein said cage comprises pockets receiving said balls therein and bars separating said pockets from each other;
   wherein said bars have a cross-sectional area S comprising a hardened layer area and a non-hardened layer area C, having a Vickers hardness less than Hv513, and a ratio C/S is set to be $0.30 \leq C/S \leq 0.75$; and
   wherein said cage has a thickness A, radial movement of said balls with respect to said cage at a maximum operating angle of said joint is B and $0.65 \leq B/A \leq 0.85$.

4. The fixed constant velocity universal joint of claim 3, wherein a surface hardness of said cage ranges between HRC58 and HRC63 and core hardness ranges between HRC25 and HRC45.

* * * * *